(12) United States Patent
Knippelmeir

(10) Patent No.: US 6,957,627 B1
(45) Date of Patent: Oct. 25, 2005

(54) WATER TRAY DRINKER FOR PIGS

(76) Inventor: Bradley W. Knippelmeir, 611 E. 5th, Fremont, NE (US) 68025

( * ) Notice: Subject to any disclaimer, the term of this patent is extended or adjusted under 35 U.S.C. 154(b) by 0 days.

(21) Appl. No.: 11/013,947

(22) Filed: Dec. 16, 2004

Related U.S. Application Data

(62) Division of application No. 10/649,245, filed on Aug. 27, 2003, now Pat. No. 6,843,206.

(51) Int. Cl.[7] ............................................. A01K 7/02
(52) U.S. Cl. .......................................... 119/77; 119/72
(58) Field of Search .................. 119/72, 74, 77–79, 119/81, 51.5, 61.2, 61.1

(56) References Cited

U.S. PATENT DOCUMENTS

| | | | |
|---|---|---|---|
| 1,227,366 A | 5/1917 | Bazinet | 119/77 |
| 2,576,154 A | 11/1951 | Trautvetter | 119/72 |
| 2,711,715 A | 6/1955 | Thale | 119/515 |
| 4,260,286 A * | 4/1981 | Buchanan | 405/82 |
| 4,281,625 A | 8/1981 | Kasai | 119/77 |
| 4,824,579 A | 4/1989 | George | 210/703 |
| 5,139,364 A * | 8/1992 | Takahashi et al. | 405/81 |
| 5,870,970 A * | 2/1999 | Katz | 119/72 |
| 6,192,831 B1 | 2/2001 | Brunse | 119/51.5 |
| 6,588,370 B1 * | 7/2003 | Odeh | 119/219 |

* cited by examiner

*Primary Examiner*—Michael J. Carone
*Assistant Examiner*—Kimberly S. Smith
(74) *Attorney, Agent, or Firm*—Thomte, Mazour & Niebergall; Dennis L. Thomte

(57) ABSTRACT

A water tray drinker for pigs comprising a tray wherein the water compartment thereof is divided into water compartment portions by divider walls of different heights. An adjustable valve water supply mechanism is positioned above the tray for automatically filling one or more of the compartment portions of the tray depending upon the vertical adjustment of the adjustable valve water supply.

2 Claims, 5 Drawing Sheets

WATER TRAY DRINKER FOR PIGS

CROSS-REFERENCE TO RELATED APPLICATION

This is a divisional application of Petitioner's earlier application Ser. No. 10/649,245 filed Aug. 27, 2003, now U.S. Pat. No. 6,843,206 entitled "A WATER TRAY DRINKER FOR PIGS".

BACKGROUND OF THE INVENTION

1. Field of the Invention

This invention relates to a watering device for animals and more particularly to a water tray drinker for pigs.

2. Description of the Related Art

The swine industry has traditionally used nipple drinkers for water presentation to the pigs within a confinement pen. The nipple drinkers have been mounted in various ways to make water available to the pigs. The primary ways are: (1) nipple drinkers mounted in the fence-line; (2) swinging nipple drinkers suspended from the ceiling in the middle of a pen; (3) nipples mounted along side tube feeders; and (4) nipples mounted in cups on the fence-line. The above-identified systems rely upon the nipple dispensing the correct water flow rate to satisfy the pigs' needs for all conditions (hot weather, over-stocking of pens and bigger pigs with increased water requirements). It is evident based upon the social and vice issues of pigs that those systems do not meet the needs of the pigs in all situations. Flow rates of nipple drinkers are highly dependent upon water pressure within the lines, orifice size of the nipples for dispensing water and the cleanliness of the screens in the nipples. If any of those elements change, the amount of water being made available to the pigs impacts social and performance of the pigs. The typical pig manager is not capable of determining flow rates at a given point in time. Those conditions can be highly variable at any point, thus creating problems with flow rates that are not discernable to the manager of the pigs.

SUMMARY OF THE INVENTION

A water tray drinker for animals such as pigs is disclosed comprising a water tray having a bottom wall, upstanding opposite first and second side walls, and upstanding opposite third and fourth side walls which define a water compartment for receiving and maintaining water therein. A plurality of horizontally spaced-apart and vertically disposed divider walls, preferably two, extend upwardly from the bottom wall and extend between the first and second side walls to separate the water compartment into a plurality of water compartment portions. If two divider walls are utilized, first, second and third water compartment portions are defined. The divider walls have progressively increasing heights from the third side wall toward the fourth side wall whereby the water compartment portions may fill progressively from the third side wall to the fourth side wall. The water compartment portion which is positioned adjacent the third side wall is in communication with a selectively adjustable valve water supply which will only fill the water compartment adjacent the third side wall unless it is adjusted upwardly to also fill the water compartment portion adjacent to the water compartment portion which is adjacent to the third side wall. Further upward vertical adjustment of the adjustable valve water supply will cause the water compartment portion adjacent the fourth side wall to also fill.

It is therefore a principal object of the invention to provide an improved watering tray for pigs and an associated vacuum valves system which does not rely on constant water pressure for a uniform flow rate to dispense water to pigs.

A further object of the invention is to provide a water tray for presenting water to pigs wherein the reservoir of water within the tray provides the pigs the ability to consume water quickly so that they may get in and out of a high activity area of the pen.

Still another object of the invention is to provide a water tray of the type described which reduces potential aggression and vice problems associated with inadequate water being supplied to the pigs.

Still another object of the invention is to provide an invention of the type described wherein the producer may readily observe the height of the water in the water tray to determine if the system is working correctly.

Still another object of the invention is to provide an invention of the type described above wherein water is readily available for presentation to the pigs.

Still another object of the invention is to provide watering tray of the type described which includes progressively increasing height divider walls which enables different amounts of water to be presented to the pigs.

Yet another object of the invention is to provide a water tray system of the type described above which includes a vacuum water valve which is readily adjustable.

A further object of the invention is to provide a watering tray which results in less water wastage while making a large amount of water available for individual pigs to drink.

Still another object of the invention is to provide a water tray drinker for pigs which results in fewer social, vice and aggressive behavior problems of the pigs utilizing the water tray drinker.

Yet another object of the invention is to provide a water tray drinker for pigs including a water reservoir in the tray which permits the pigs to get in and out of the water quickly, thereby minimizing the potential for aggressive and vices.

Still another object of the invention is to provide a water tray drinker for pigs of the type described which enables the producer to easily provide increased water for pig intake during peak activity periods resulting in increased feed consumption and better growth rates.

These and other objects will be apparent to those skilled in the art.

DESCRIPTION OF THE PREFERRED EMBODIMENT

Figure 1:
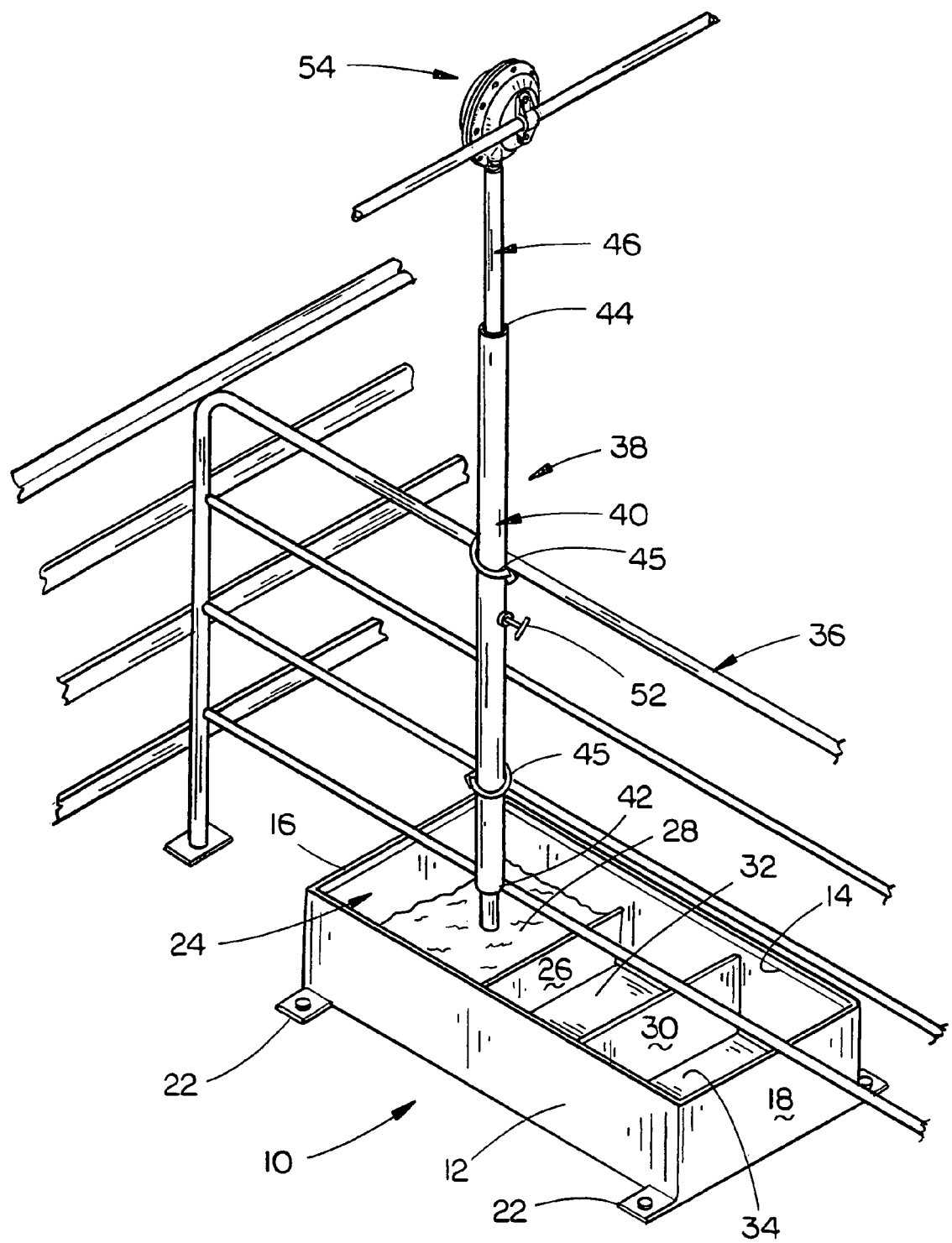
FIG. 1 is a perspective view of the water tray drinker for pigs of this invention with the water tray being positioned between adjacent confinement pens.

The water tray which is utilized in this invention is referred to generally by the reference numeral 10 and includes a first side wall 12, a second side wall 14, a third side wall 16 and a fourth side wall 18 which extend upwardly from a bottom 20. Preferably, the tray 10 has mounting brackets 22 extending therefrom which enable the tray to be secured to the floor of the pen by means of screws or the like extending through the brackets 22.

Figure 2:
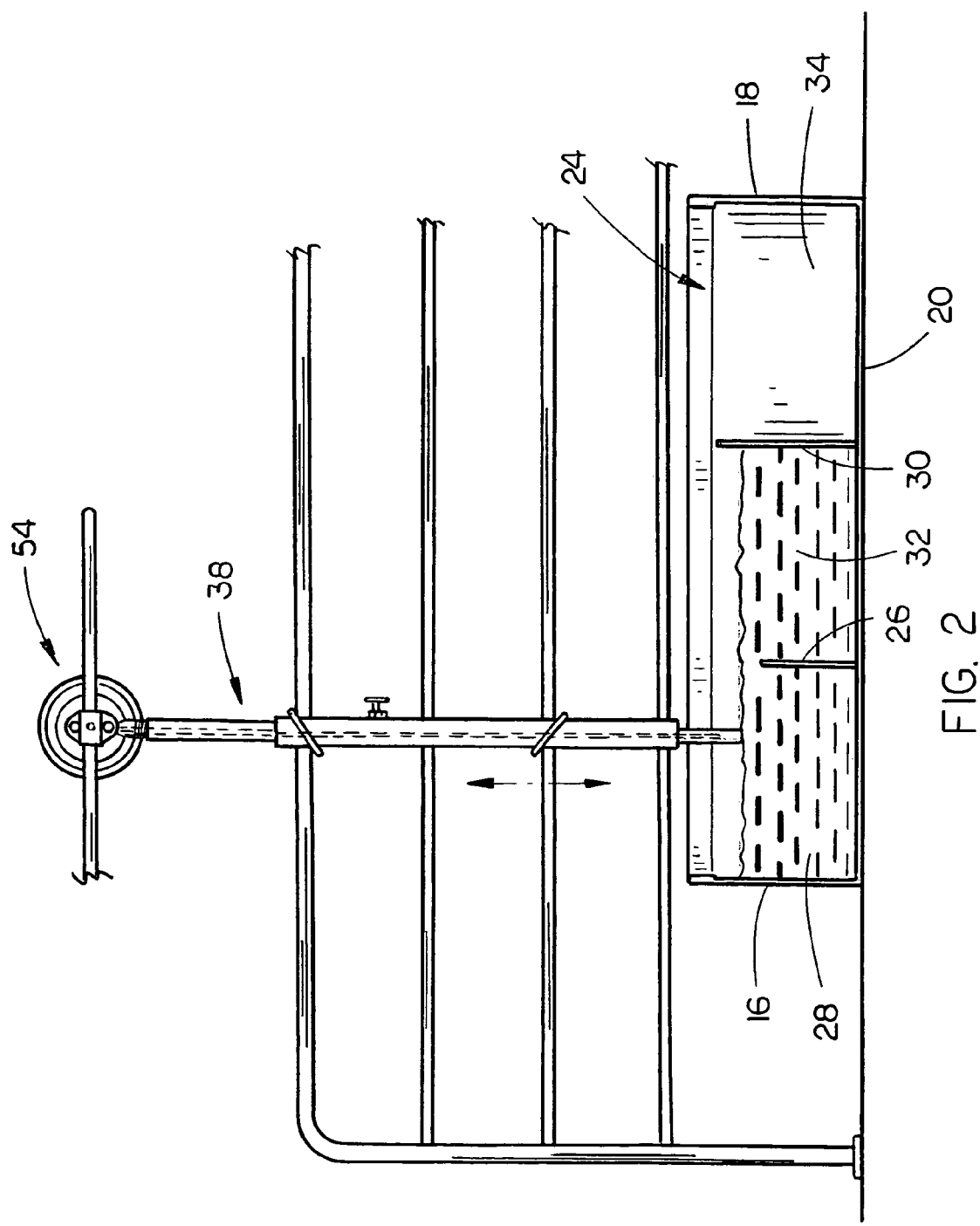
FIG. 2 is a side elevational view of FIG. 1.

The side walls 12, 14, 16 and 18 generally define a water compartment 24. A first divider wall 26 extends upwardly from bottom 20 between walls 12 and 14 and it preferably has a height of 1.5 inches. As seen in the drawings, divider wall 26, side walls 12, 14 and 16 define a first water compartment portion 28. A second divider wall 30 extends upwardly from bottom 20 between side walls 12 and 14 between divider wall 26 and fourth side wall 18, as seen in the drawings, and preferably has a height of 2.0 inches. The height of walls 12, 14, 16 and 18 is somewhat greater than the height of divider wall 30, as seen in FIG. 2. Divider walls 26 and 30 define a water compartment portion 32 while divider wall 30 and fourth side wall 18 define a water compartment portion 34 therebetween. Although the drawings illustrate a pair of spaced-apart divider walls, any number of divider walls could be utilized although two divider walls are preferred.

The water tray 10 is positioned on the floor of the confinement area so that it is positioned beneath the pen divider 36 with the side walls 16 and 18 and the divider walls 26 and 30 being disposed transversely to the pen divider 36. Thus, approximately one-half of the water compartment portions 28, 32 and 34 are accessible by the pigs on either side of the pen divider 36.

The means for supplying water to the tray 10 is generally referred to by the reference numeral 38. Means 38 includes a vertically disposed pipe 40 having a lower end 42 and an upper end 44. Pipe 40 is selectively vertically adjustably secured to the pen divider wall 36 by U-clamps 45 or the like. The numeral 46 refers to a vertically disposed pipe which is selectively adjustable positioned within pipe 40 and which has an upper end 48 and a lower end 50. The lower end 50 of pipe 46 is positioned above water compartment portion 28, as illustrated in the drawings. The pipe 46 is selectively vertically adjustably mounted with respect to the pipe 40 by means of a set screw 52 which threadably extends through pipe 40 for engagement with the pipe 46 to maintain the pipe 46 in selective vertical positions with respect to pipe 40.

Figure 6:
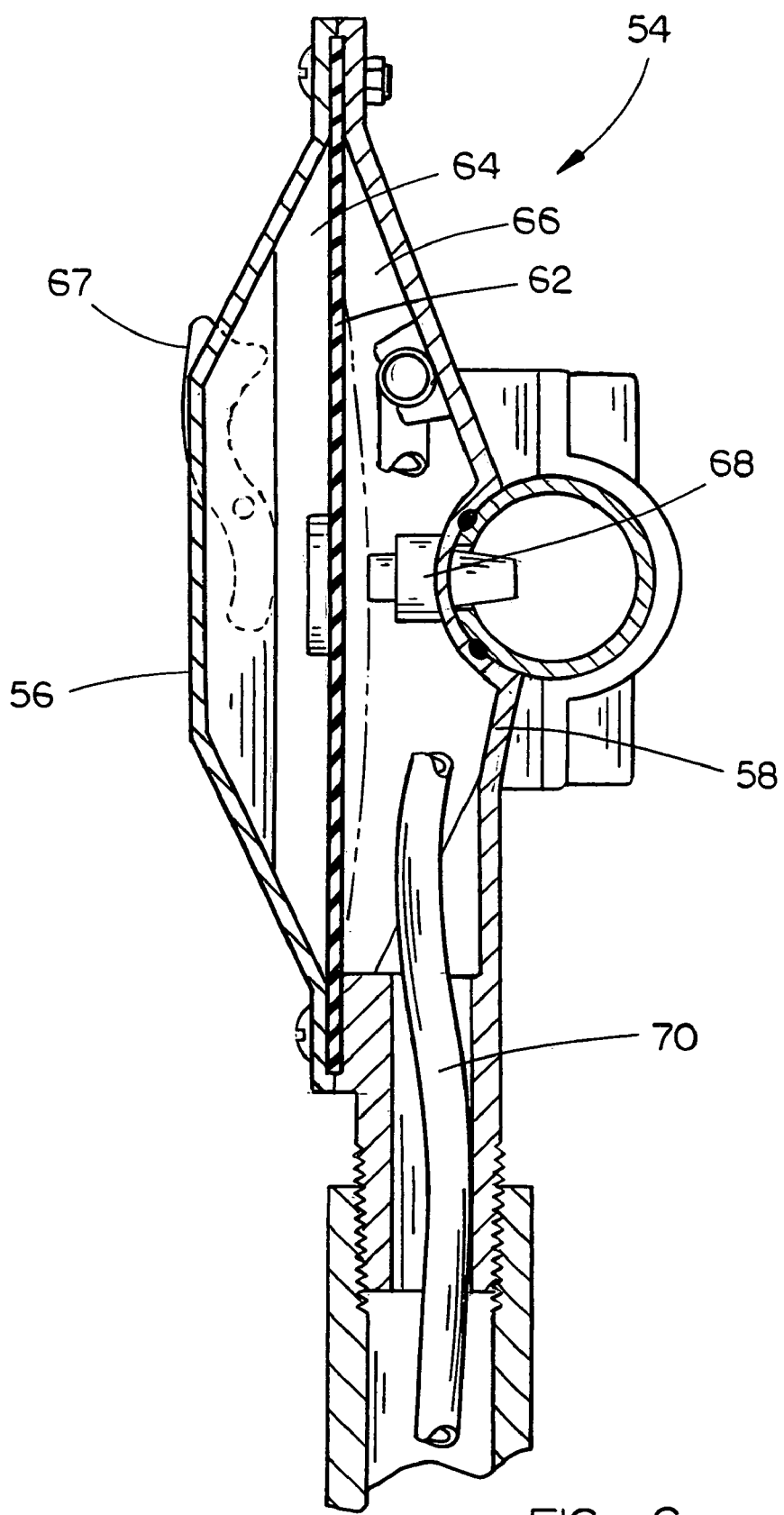
FIG. 6 is a sectional view of the vacuum valve utilized in this invention.

A conventional vacuum water valve 54, such as manufactured by Rotecna S. A., Poligono Industrial. Nave n.3, 25310 Agramunt (Lleida) Spain, is mounted to the upper end of pipe 46, as illustrated in the drawings. Valve 54 includes casing members 56 and 58 which are secured together at their peripheries by means of bolts 60. A diaphragm 62 is secured to the peripheries of casing members 56 and 58 to define compartment portions 64 and 66 within valve 54. A water inlet port 68 extends inwardly through casing member 58 so that the inner end thereof is in communication with compartment portion 66 (FIG. 6). Port 68 is in fluid communication with the interior of water pipe or tube 69 which is in fluid communication with a source of water so that water is supplied to compartment portion 66. Diaphragm 62 is adapted to seal the inner end of port 68 to prevent water from entering the interior of compartment portion 66. Valve 54 includes a conventional water shut-off mechanism 67.

Figure 3:
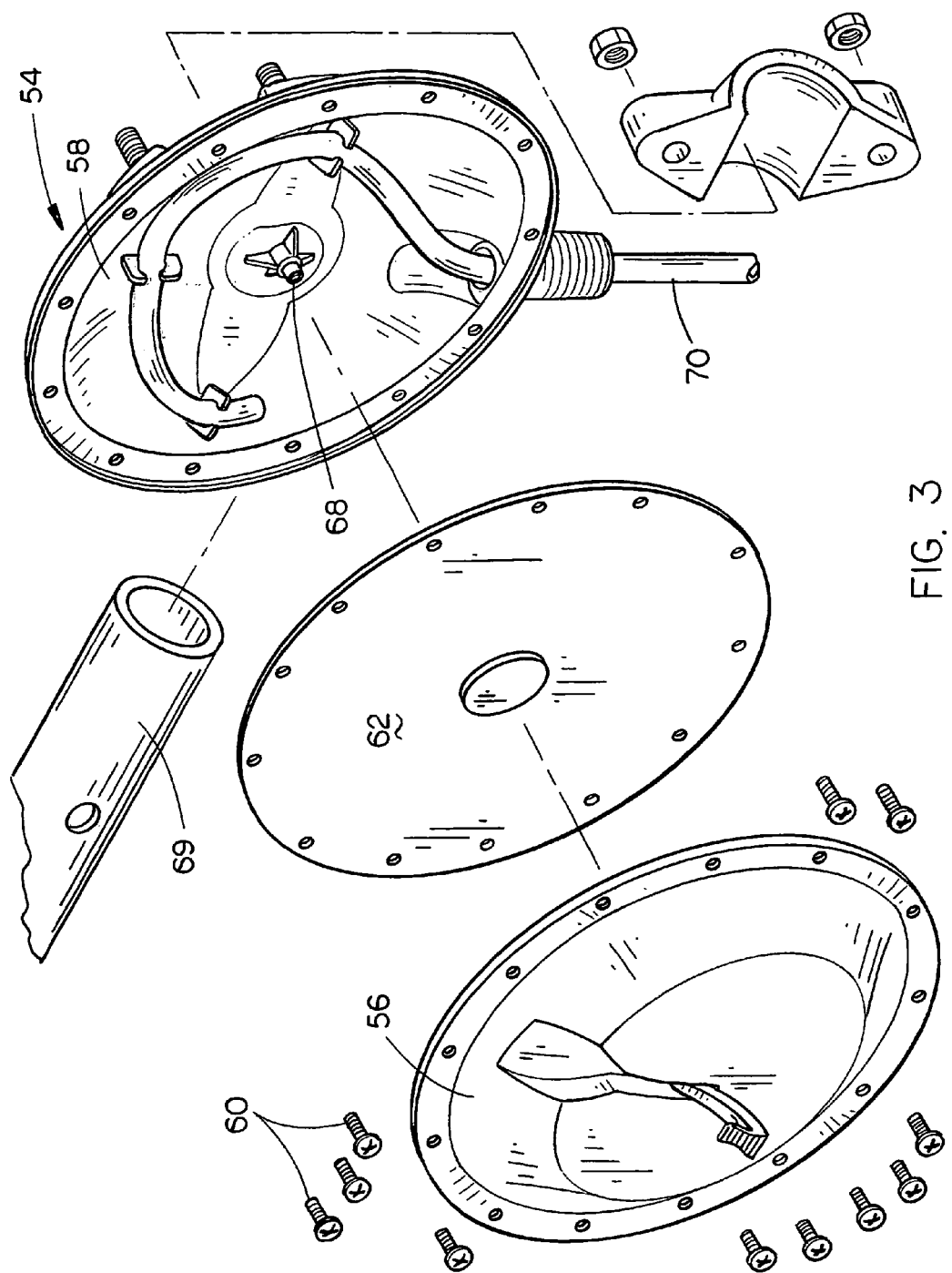
FIG. 3 is an exploded perspective view of the vacuum valve utilized with the invention herein.
Figures 4, 5:
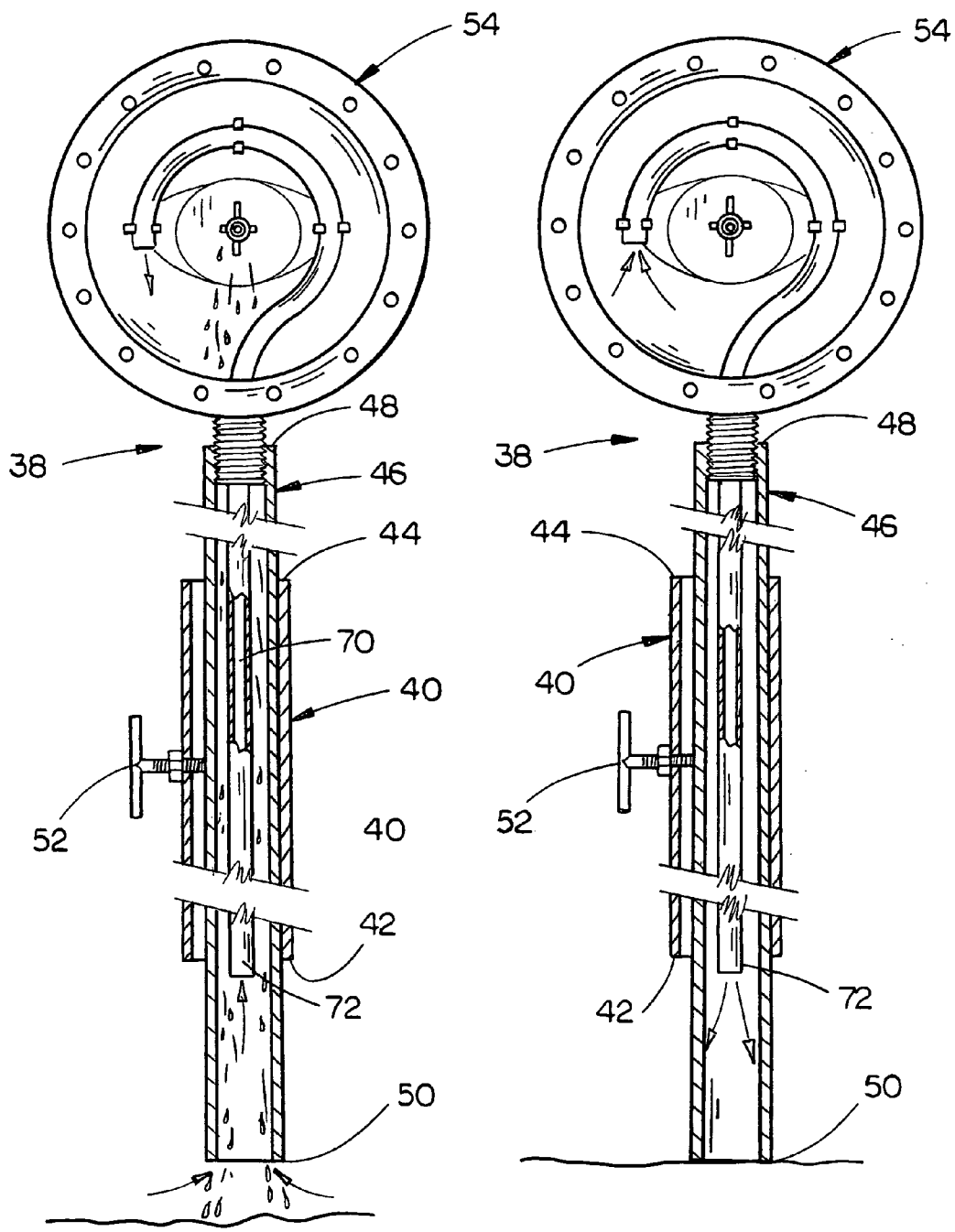
FIG. 4 is a vertical sectional view of the adjustable valve water supply.
FIG. 5 is a view similar to FIG. 4 except that the adjustable valve water supply has discontinued the supply of water to the tray.

A flexible plastic tube 70 is provided in the water vacuum valve 54, as illustrated in FIG. 3, and has its lower end 72 positioned approximately nine inches above the lower end 50 of pipe 46, as seen in the drawings. The lower end 50 of pipe 46 is initially positioned slightly below the upper end of divider wall 26. In normal operation, water is supplied to port 68 and flows downwardly between tube 70 and the interior of pipe 46 (FIG. 4) and continues to flow until water in compartment portion 28 reaches the lower end 50 of pipe 46. When the water in water compartment portion 28 reaches the lower end 50 of pipe 46, the vacuum within compartment 66 in the valve 54 causes the diaphragm 62 to seal upon the inner end of the inlet port 68 thereby preventing further water from flowing into compartment portion 28. As the pigs consume water from the water compartment portion 28, the water level in compartment portion 28 will drop below the lower end 50 of pipe 46 which will cause the diaphragm 62 to unseat from the inner end of the inlet port 68 so that additional water will be supplied to compartment portion 28 until the water level in water compartment portion 28 reaches the lower end 50 of pipe 46 which will again cause the diaphragm 62 to seal or close the inner end of water inlet port 68.

If additional water is desired to be furnished to the pigs, the set screw 52 is loosened and the pipe 46 is raised with respect to the pipe 40 so that the lower end 50 of pipe 46 is positioned above the upper end of divider wall 26 but is positioned below the upper end of divider wall 30. Water flowing from the lower end of pipe 46 will fill compartment portion 28 with the overflow therefrom flowing into water compartment portion 32 until the water level within the tray 10 reaches the lower end 50 of the pipe 46 which will again cause the inner end of the inlet port 68 to be sealed by the diaphragm so that additional water is not supplied to the water tray.

If even additional water is desired to be supplied to the water tray 10, the pipe 46 is further raised with respect to pipe 40 so that the lower end 50 of pipe 46 is positioned above the upper end of divider wall 30 but is positioned below the upper end of the side walls 12, 14, 16 and 18 so that water compartment portion 34 will also be filled.

It can therefore be seen that the invention accomplishes at least all of its stated objectives.

I claim:

1. A watering device for animals, comprising:
    a water tray having a bottom wall, upstanding opposite first and second side walls, and upstanding opposite third and fourth side walls which define a water compartment for receiving and maintaining water therein;
    a plurality of horizontally spaced-apart and vertically disposed divider walls extending upwardly from said bottom wall and extending between said first and second side walls to separate said water compartment into a plurality of water compartment portions;
    said divider walls having progressively increasing heights from said third side wall towards said fourth side wall whereby the water compartment portions may fill progressively from said third side wall to said fourth side wall;
    said water compartment portion which is positioned adjacent said third side wall being in communication with a selectively adjustable valved water supply which will only fill said water compartment adjacent said third side wall unless it is adjusted to also fill the water compartment portion adjacent to said water compartment portion which is adjacent to said third side wall.

2. A water device for animals, comprising:
    a water tray having a bottom wall, and upstanding opposite first and second side walls, and upstanding opposite third and fourth side walls which define a water compartment for receiving and maintaining water therein;

a first divider wall extending upwardly from said bottom wall and extending between said first and second side walls to define a first water compartment portion between said third side wall and said first divider wall;

a second divider wall extending upwardly from said bottom wall and extending between said first and second side walls to define a second water compartment between said first and second divider walls;

said second divider wall and said fourth side wall defining a third water compartment portion therebetween;

said first divider wall having a height less than the height of said second divider wall;

said second divider wall having a height less than the height of said side walls;

said first water compartment portion being in communication with a selectively adjustable valved water supply which will only fill said first water compartment portion unless it is adjusted to also fill said second water compartment portion and which will only fill said first and second water compartment portions unless it is adjusted to also fill said third water compartment portion.

* * * * *